United States Patent [19]

Tam

[11] Patent Number: 5,365,560
[45] Date of Patent: Nov. 15, 1994

[54] METHOD AND APPARATUS FOR ACQUIRING A UNIFORM DISTRIBUTION OF RADON DATA SUFFICIENTLY DENSE TO CONSTITUTE A COMPLETE SET FOR EXACT IMAGE RECONSTRUCTION OF AN OBJECT IRRADIATED BY A CONE BEAM SOURCE

[75] Inventor: Kwok C. Tam, Schenectady, N.Y.
[73] Assignee: General Electric Company, Schenectady, N.Y.
[21] Appl. No.: 737,525
[22] Filed: Jul. 29, 1991
[51] Int. Cl.$^5$ .................................... G01N 23/083
[52] U.S. Cl. ................................ 378/8; 378/901; 378/14; 364/413.15; 364/413.16
[58] Field of Search .............. 378/4, 8, 14, 901; 364/413.15, 413.16, 413.17, 413.26

[56] References Cited

U.S. PATENT DOCUMENTS

| | | | |
|---|---|---|---|
| 5,068,882 | 11/1991 | Eberhard | 378/4 |
| 5,073,910 | 12/1991 | Eberhard et al. | 378/4 |
| 5,170,439 | 12/1982 | Zeng et al. | 382/6 |
| 5,187,659 | 2/1993 | Eberhard et al. | 364/413.15 |
| 5,218,534 | 6/1993 | Trousset et al. | 364/414.17 |

OTHER PUBLICATIONS

Cone-Beam Tomography: Recent Advances and a Tutorial Review, Bruce D. Smith, Optical Engineering, May 1990, vol. 29, No. 5, pp. 524–534.
Image Reconstruction from Cone-Beam Projections: Necessary and Sufficient Conditions and Reconstruction Methods, Bruce D. Smith, IEEE Transactions on Medical Imaging, Mar. 1985, vol. MI-4, No. 1, pp. 14–25.
An Inversion Formula for Cone-Beam Reconstruction Heang K. Tuy, Siam J. Appl. Math. Jun. 1983, vol. 43, No. 3, pp. 546–552.
Convolutional Reconstruction From Cone-Beam Projection Data, Gerald N. Minerbo, IEEE Transactions on Nuclear Science, vol. NS-26, No. 2, Apr. 1979, pp. 2682–2684.
Practical Cone-Beam Algorithm, L. A. Feldkamp, L. C. Davis, and J. W. Kress, J. Opt. Soc. Am. A, vol. 1, No. 6, Jun. 1984, pp. 612–619.
P. Grangeat, "Analysis of a 3D Imaging System by Reconstruction from X-Radiographies in Conical Geometry," Ph.D. Thesis, National College of Telecommunications, (l'Ecole Nationale Superieure des Telecommunications), France (1987) [translation enclosed].

Primary Examiner—Paul M. Dzierzynski
Assistant Examiner—David V. Bruce
Attorney, Agent, or Firm—David C. Goldman; Paul R. Webb, II

[57] ABSTRACT

A method and apparatus for acquiring scanning cone beam projection data along a three dimensional scanning trajectory is disclosed. The technique ensures acquisition of a substantially uniform distribution of Radon data that is sufficiently complete for exact image reconstruction of an object irradiated by a scanning cone beam source. By choosing a scanning trajectory whose planar projection onto a plurality of coaxial planes, when taken together, forms a continuous, convex, closed curve about a corresponding projection of the object being scanned; the Radon information obtained therefrom is complete and information coverage is uniform over the region of support of the object. Accordingly, this condition provides a practical, easy to implement, visual method for evaluating candidate three dimensional scanning trajectories.

8 Claims, 12 Drawing Sheets

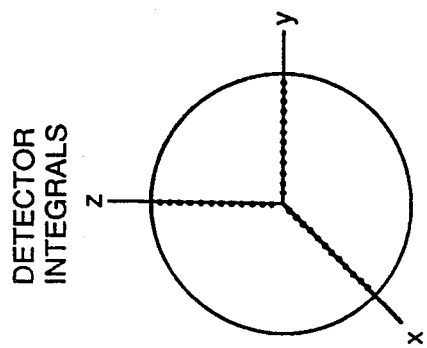
FIG. 2c Detector Integrals
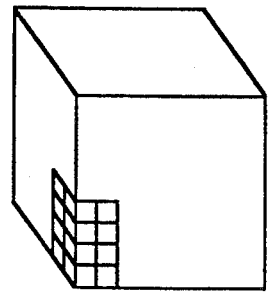
FIG. 2f 3D CT Image
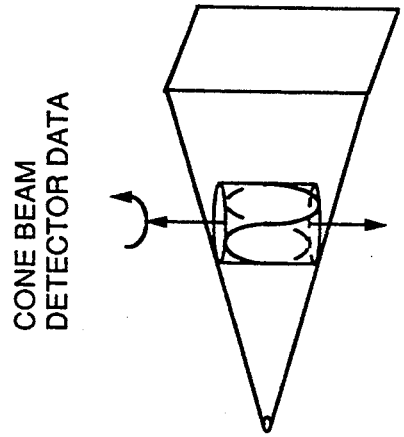
FIG. 2b Cone Beam Detector Data
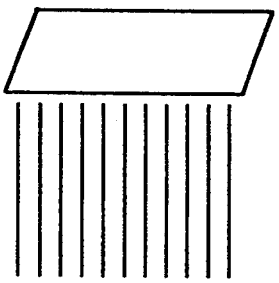
FIG. 2e Parallel Beam Detector Data
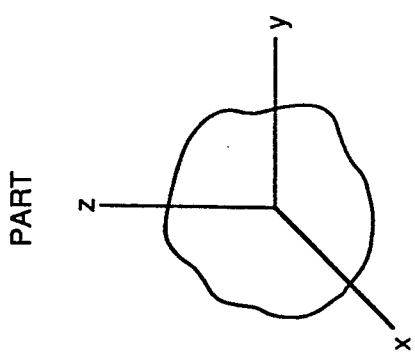
FIG. 2a Part
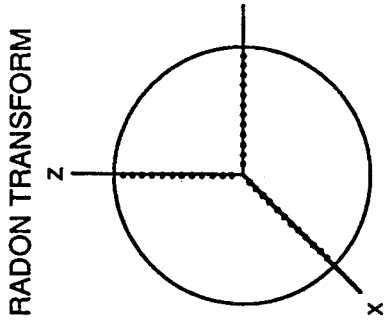
FIG. 2d Radon Transform

METHOD AND APPARATUS FOR ACQUIRING A UNIFORM DISTRIBUTION OF RADON DATA SUFFICIENTLY DENSE TO CONSTITUTE A COMPLETE SET FOR EXACT IMAGE RECONSTRUCTION OF AN OBJECT IRRADIATED BY A CONE BEAM SOURCE

CROSS-REFERENCE TO RELATED APPLICATIONS

The invention disclosed and claimed herein is related to the subject matter of the following commonly-assigned patent applications, the entire disclosures of which are hereby expressly incorporated herein by reference:

Co-pending application Ser. No. 07/737,117 filed Aug. 29, 1991 by Kwok C. Tam entitled "METHOD FOR CONSTRUCTING A THREE DIMENSIONAL SCANNING TAJECTORY CAPABLE OF ACQUIRING A COMPLETE SET OF RADON DATA FOR EXACT IMAGE RECONSTRUCTION OF AN OBJECT IRRADIATED BY A CONE BEAM SOURCE";

Co-pending application Ser. No. 07/725,142 filed Jul. 3, 1991 by Kwok C. Tam entitled "METHOD AND APPARATUS FOR ACQUIRING COMPLETE RADON DATA FOR EXACTLY RECONSTRUCTING A THREE DIMENSIONAL COMPUTERIZED TOMOGRAPHY IMAGE OF A PORTION OF AN OBJECT IRRADIATED BY A CONE BEAM SOURCE";

U.S. Pat. No. 5,257,183, filed Dec. 21, 1990, to Kwok C. Tam, entitled "METHOD AND APPARATUS FOR CONVERTING CONE BEAM X-RAY PROJECTION DATA TO PLANAR INTEGRALS AND RECONSTRUCTING A THREE-DIMENSIONAL COMPUTERIZED TOMOGRAPHY (CT) IMAGE OF AN OBJECT";

Co-pending application Ser. No. 07/631,818, filed Dec. 21, 1990, by Kwok C. Tam, now abandoned, entitled "PARALLEL PROCESSING METHOD AND APPARATUS FOR RECONSTRUCTING A THREE-DIMENSIONAL COMPUTERIZED TOMOGRAPHY (CT) IMAGE OF AN OBJECT FROM CONE BEAM PROJECTION DATA OR FROM PLANAR INTEGRALS";

U.S. Pat. No. 5,073,910, filed Aug. 27, 1990, to Jeffrey W. Eberhard et al, entitled "SQUARE WAVE CONE BEAM SCANNING TRAJECTORY FOR DATA COMPLETENESS IN THREE DIMENSIONAL COMPUTERIZED TOMOGRAPHY";

U.S. Pat. No. 5,068,882, filed Aug. 27, 1990, to Jeffrey W. Eberhard et al, entitled "DUAL PARALLEL CONE BEAM CIRCULAR SCANNING TRAJECTORIES FOR REDUCED DATA INCOMPLETENESS IN THREE-DIMENSIONAL COMPUTERIZED TOMOGRAPHY"; and U.S. Pat. No. 5,270,926, filed Dec. 21, 1990 to Kwok C. Tam, entitled "METHOD AND APPARATUS FOR RECONSTRUCTING A THREE-DIMENSIONAL COMPUTERIZED TOMOGRAPHY (CT) IMAGE OF AN OBJECT FROM INCOMPLETE CONE BEAM PROJECTION DATA".

BACKGROUND OF THE INVENTION

The present invention relates generally to three dimensional (3D) computerized tomography (CT) and more specifically to a method and apparatus for acquiring cone beam data along a three dimensional scanning trajectory to obtain a substantially uniform distribution of Radon data that is sufficiently dense to ensure the acquisition of a complete set of Radon data for exact image reconstruction of an object irradiated by a cone beam source.

Conventional CT employs a technique for obtaining cross sectional slices of an object from planar parallel or fan beam irradiation of an object. The technique is primarily utilized in medical and industrial diagnostics. Traditional image reconstruction techniques have been predominantly two dimensional. In three dimensions, an undistorted image of an object can be mathematically reconstructed in an exact manner by back projecting a parallel beam which has been attenuated after passing through the object using an inverse transform based on the Fourier Slice Theorem. The use of a parallel beam source and a flat two dimensional detector geometrically simplifies reconstruction but complicates practical considerations having to do with speed and ease of data collection.

Back projections can be mathematically accomplished for a 3D cone beam source by inverse Radon transforming suitable planar integrals. The planar integrals are computed from detector integrals which utilize measured cone beam projection data i.e. the detected attenuated intensity representative of the density distributions of the irradiated object. The use of a 3D cone beam source expedites data acquisition, but complicates geometrical considerations when used with a flat array detector.

In two dimensions, the analog of a cone beam source geometry is illustrated by fan beam geometry. For the case of two dimensional fan beam geometry, the detector integrals are equivalent to the Radon transform of the object. Unlike the two dimensional case, a direct Radon inversion of three dimensional cone beam data from a cone beam source is not possible. Before the inverse Radon transform can be undertaken in three dimensions, the cone beam detector integrals must be reconfigured into planar integrals suitable for inverse Radon transformation. Due to the limitations of direct inversion, three dimensional CT imaging has traditionally involved stacking slices representative of the density distribution through the object obtained from various parallel or fan beam attenuation projections. Each projection is associated with a particular view angle or configuration of source and detector relative to the object. A data set is generally acquired by either rotating a source and detector, fixed relative to each other, around an object taking projections as the object is scanned; or alternatively, rotating the object between the fixed source and detector.

The three dimensional Radon inversion problem was addressed in two commonly assigned patent applications: U.S. patent application Ser. No. 07/631,815 filed Dec. 18, 1990 by Kwok C. Tam, now U.S. Pat. No. 5,257,183, entitled METHOD AND APPARATUS FOR CONVERTING CONE BEAM X-RAY PROJECTION DATA TO PLANAR INTEGRALS AND RECONSTRUCTING A THREE-DIMENSIONAL COMPUTERIZED TOMOGRAPHY (CT) IMAGE OF AN OBJECT discloses method and apparatus for converting cone beam data to values representing planar integrals on any arbitrary set of planes in Radon space for 3D image reconstruction through inverse Radon transformation. A related U.S. patent application Ser. No. 07/631,818 filed on Dec. 21, 1990 by Kwok C. Tam, now abandoned, entitled PARALLEL PROCESSING METHOD AND APPARATUS FOR RECONSTRUCTING THREE-DIMENSIONAL COMPUTERIZED TOMOGRAPHY (CT) IMAGE OF AN OBJECT FROM CONE BEAM PROJECTION DATA OR FROM PLANAR INTEGRALS discloses a two step approach for performing an inverse Radon transform from planar integrals obtained on a plurality of coaxial planes. The first step involves calculating from the planar integrals a two dimensional projection image of the object on each of a plurality of coaxial planes; while the second step involves defining normal slices through these coaxial planes from which a two dimensional reconstruction of each slice is obtained. In this slice by slice way, the reconstruction algorithms operate on the plurality of planar integrals to produce a three dimensional image of the object.

It is further essential to note that the acquired data set is complete only if it provides sufficient Radon data at every necessary point in Radon space, i.e. Radon space must be sufficiently filled with data over the region of support in Radon space which corresponds to that region in object space occupied by the object. Radon data is generally acquired by exposing an object within the field of view of a source and scanning about the object using a source fixed with respect to a corresponding detector to obtain measurements. Sufficient filling of Radon space by a candidate scanning trajectory is necessary for exact image reconstruction. Furthermore, if the detector integral space is filled over the region of support for the object, the Radon data set is complete. Bruce D. Smith in an article entitled "Image Reconstruction from Cone-Beam Projections: Necessary and Sufficient Conditions and Reconstruction Methods," IEEE Trans. Med. Imag., MI-4 (1985) 14, has shown that a cone beam data set is complete if each plane passing through the object cuts the scanning trajectory in at least one point. This criterion assumes that the detector is fixed relative to the source and that the entire object can be scanned in a continuous manner within the field of view of the source. Depending on the scanning configuration employed to obtain the cone beam projection data, the data set in Radon space may or may not be complete. Furthermore, the method of acquiring cone beam data along a suitable scanning trajectory determines whether Radon space is filled completely. The necessary volume of Radon space must be filled in a sufficiently dense as well as uniform manner to reflect consistency in the inversion process. Underfilling results in incomplete data, while overfilling results in redundant data. Clearly both the density of Radon data and the distribution of this density contribute to the accuracy and efficiency of image reconstruction. Utilizing an incomplete and/or non-uniform data set for image reconstruction by Radon inversion introduces artifacts which compromise image quality and may render the image inadequate for medical or industrial diagnostic use.

The scanning trajectory chosen for data acquisition significantly impacts the quality of data obtained. A scanning configuration comprising two circular trajectories whose axes of rotation are normal with respect to one another is suggested by Gerald N. Minerbo in "Convolutional Reconstruction from Cone-Beam Projection Data" IEEE Trans Nucl. Sci., Vol. NS-26, No. 2, pp. 2682-2684 (April 1979); and Heang K. Tuy in "An Inversion Formula for Cone-Beam Reconstruction" SIAM J Math, Vol. 43, No. 3, pp 546-552 (June 1983). Smith points out in his 1985 article that this trajectory satisfies the completeness criterion. Although complete, this scanning configuration is not practical as it is mechanically difficult to implement. A much easier to implement complete scanning trajectory has been disclosed in commonly assigned U.S. patent application Ser. No. 07/572,651, filed Aug. 27, 1990, by Eberhard et al, now U.S. Pat. No. 5,073,910, entitled "SQUARE WAVE CONE BEAM SCANNING TRAJECTORY FOR DATA COMPLETENESS IN THREE-DIMENSIONAL COMPUTERIZED TOMOGRAPHY". However, the scanning geometry most commonly adopted is the simple circular scanning trajectory which engulfs the object in the field of view of the source. Although easily implemented, a circular scanning trajectory acquires incomplete data. A scanning configuration which minimizes data incompleteness obtained from dual circular scans is disclosed in commonly-assigned U.S. patent application Ser. No. 07/572,590, filed Aug. 27, 1990, by Eberhard, now U.S. Pat. No. 5,068,882, entitled "DUAL PARALLEL CONE BEAM CIRCULAR SCANNING TRAJECTORIES FOR REDUCED DATA INCOMPLETENESS IN THREE DIMENSIONAL COMPUTERIZED TOMOGRAPHY".

Commonly assigned U.S. patent application Ser. No. 07/572,590 discloses an apriori approach to reducing the effects of incompleteness on three dimensional cone beam reconstruction by correcting two dimensional projection images obtained on each of a plurality of coaxial planes in Radon space using optically obtained object boundary information. From this, a three dimensional image is reconstructed on slices normal to the common axis in a slice by slice manner using two dimensional reconstruction on each slice. There is generally no a priori method to account for missing Radon data. Only proper data acquisition ensures a complete data set having sufficiently dense information to accurately reconstruct the image in a uniform manner by employing sampling consistent with a uniform data density distribution.

Generally a difficult to implement method for assessing whether a source scanning trajectory satisfies both the completeness criterion and a uniformity criterion has been disclosed for accommodating efficient exact image reconstruction in three dimensions. Three dimensional exact image reconstruction is by its very nature computationally intensive; therefore, ensuring that data is collected in a manner that sufficiently fills the necessary volume of Radon space in a uniformly distributed efficient manner without unduly escalating the complexity of practical data acquisition provides a significant improvement over the existing art.

A typical scanning and data acquisition configuration employing cone beam geometry is depicted in FIG. 1. An object 20 is positioned within the field of view between a cone beam point source 22 and a typical two dimensional detector array 24, which provides cone beam projection data. An axis of rotation 26 passes through the field of view and the object 20. For purpose of analysis, a midplane 28 is defined normal to the axis of rotation 26 which contains the cone beam point source 22. By convention, the axis of rotation 26 is generally taken to be the z axis, having its origin at its intersection with the midplane. The object centered (x,y,z) coordinate system is fixed relative to the source 22 and detector 24. In scanning the object 20 at a plurality of angular positions, the source 22 moves relative to the object and the field of view typically rotates along a preferably circular scanning trajectory 30 lying in the midplane 28, while the detector 24 remains fixed with respect to the source 22 (or alternatively the object 20 can be rotated while the source 22 and detector 24 remain stationary). Data is acquired at a plurality of source positions during the scan. Data collected at detector 24 represent line integrals through the object 20. The approach to reconstruction then embodies calculating planar integrals on a corresponding set of coaxial planes from various line integrals through the object, then performing an inverse Radon transform on these planar integrals to reconstruct a three dimensional image of the object.

It has already been noted that data collected using a commonly adopted single circular scan is incomplete and artifacts may accordingly be introduced into the reconstructed image. Dual parallel circular scanning trajectories have been shown to reduce data set incompleteness. A circular square wave scanning trajectory, on the other hand, as well as, dual mutually perpendicular circular scanning trajectories provide sufficient Radon data for exact image reconstruction by satisfying the completeness criterion. More recently, Bruce D. Smith in an article entitled "Cone-beam Tomography: Recent Advances and a Tutorial Review", Optical Engineering, Vol. 29, No. 5, pp. 524–534, May 1990, mentions several complete scanning trajectories. Applicant has articulated a practical to implement, easy to visualize statement of the completeness criterion evaluating several examples of complete three dimensional scanning trajectories in co-pending U.S. patent application Ser. No. 07/737,117. However, no such easy to utilize criterion for ensuring the uniform density of complete data so obtained has been disclosed.

OBJECTS OF THE INVENTION

Accordingly it is an object of the invention to provide a practical, visual method for providing a three dimensional scanning trajectory which ensures that the density of the Radon data set acquired therefrom is uniform in distribution, i.e. ensuring uniform information coverage for exact image reconstruction.

It is another object of the invention to provide a method for ensuring that the signal-to-noise ratio for each cone beam datum is substantially the same.

It is yet another object of the invention to preserve relative uniformity among projected data distributions by down-sampling.

It is a further object of the invention to provide a practical approach to designing a three dimensional scanning trajectory which satisfies the uniformity criterion.

It is a still further object of the invention to reduce computational requirements of 3D image reconstruction without compromising image quality.

It is still another object of the invention to provide such a method which may be readily implemented in commonly adopted scanning trajectories without unduly escalating complexity, cost or dose.

SUMMARY OF THE INVENTION

It is recognized that Radon data for image reconstruction of an object scanned by a cone beam source are calculated from cone beam data obtained on each of a plurality of coaxial planes. It is further recognized that for any plane, Radon data so generated by 3D cone beam scanning along a three dimensional scanning trajectory are identical to that generated on said plane by 2D fan beam scanning along the projection of said trajectory onto said plane. In accordance with the invention, as long as signal-to-noise ratio among cone beam data is substantially the same the following is true. For any point enclosed by a continuous curve formed by planar projection of said scanning trajectory, the density of Radon data at said point corresponds to the number of times a line orthogonal to a segment connecting said point to the object centered origin intersects said projected scanning trajectory. Wherein, a method for ensuring said substantially the same signal-to-noise ratio corresponding to each source position is provided. In accordance with the invention, it is further recognized that if said projected scanning trajectory forms a continuous, convex, closed curve, by geometry said line intersects said curve in two and only two points thereby ensuring a uniform distribution of Radon data within said curve. A condition which further satisfies the completeness criterion.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings in which:

FIG. 2a-2f illustrates a generalized Radon transform approach to three dimensional CT imaging;

DETAILED DESCRIPTION OF THE INVENTION

Figure 1:
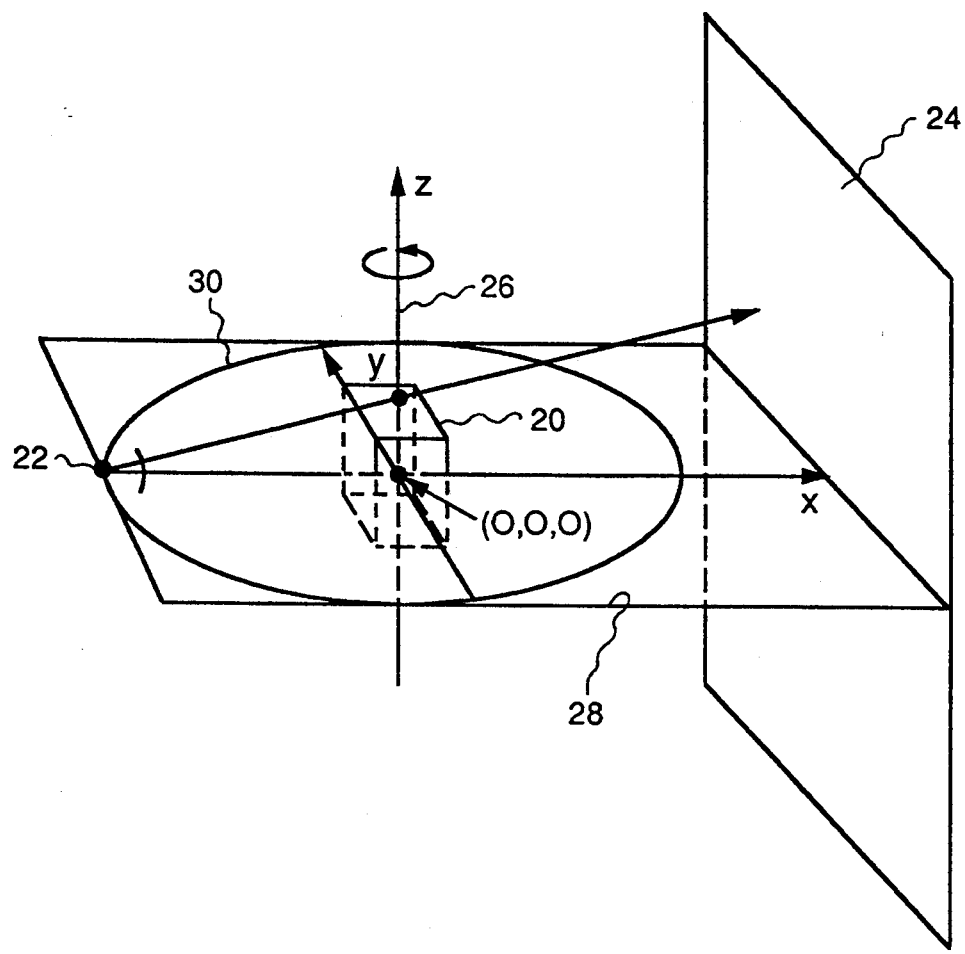
FIG. 1 is an illustration of a prior art three dimensional CT scanning configuration.

According to FIGS. 2a through 2f Radon data are calculated from cone beam data. This process is undertaken in a point by point manner. A point occupied by an object is defined in terms of its attenuation coefficient f (x,y,z) as seen in FIG. 2a. The measured cone beam projection datum then correspond to an integral of this attenuation function about a scanning trajectory as shown in FIG. 2b where "s" indicates the beam source. The detector integrals are represented as line integrals of the cone beam projection data which in three dimensions correspond to surface integrals of attenuation as seen in FIG. 2c. For a cone beam source, the Radon transform is given in FIG. 2d, which differs in form from the detector integral of FIG. 2c by a factor of "r". Co-pending application Ser. No. 07/631,815, filed Dec. 21, 1990, by Kwok C. Tam, entitled "METHOD AND APPARATUS FOR CONVERTING CONE BEAM X-RAY PROJECTION DATA TO PLANAR INTEGRALS AND RECONSTRUCTING A THREE-DIMENSIONAL COMPUTERIZED TOMOGRAPHY (CT) IMAGE OF AN OBJECT discusses an intermediate step for converting cone beam detector integrals (line integrals) to planar integrals having a form suitable for inverse Radon transform (i.e. Radon data). Radon space must be filled with data over a region of support which corresponds to the field of view in real space within which the object being scanned resides. In other words if the detector integral space is filled over a region of support for the object exact image reconstruction is possible. Completeness, that is the sufficiency of Radon data over the region of support, can be assured through the proper choice of scanning trajectory. However; uniformity in the distribution of Radon data over the region of support is also a concern for accurate and efficient image reconstruction. The present invention is directed toward ensuring such uniformity. FIGS. 2e and 2f illustrate the Radon inversion process for reconstructing an image from the detector integrals for the simple case of a parallel beam source which inverts directly, i.e. no intermediate conversion step is required. The process of three dimensional cone beam inversion is considerably complicated by imposing an additional dimensional requirement that each Radon datum represents a surface integral and further complicated due to the intermediate conversion required to accommodate direct Radon transform inversion.

Some of these problems have already been addressed in two commonly assigned patent applications: U.S. patent application Ser. No. 07/631,815 filed Dec. 18, 1990 by Kwok C. Tam entitled METHOD AND APPARATUS FOR CONVERTING CONE BEAM X-RAY PROJECTION DATA TO PLANAR INTEGRAL AND RECONSTRUCTING A THREE-DIMENSIONAL COMPUTERIZED TOMOGRAPHY (CT) IMAGE OF AN OBJECT discloses method and apparatus for converting cone beam data to values representing planar integrals on any arbitrary set of planes in Radon space for 3D image reconstruction through inverse Radon transformation. A related U.S. patent application Ser. No. 07/631,818 filed on Dec. 21, 1990 by Kwok C. Tam entitled PARALLEL PROCESSING METHOD AND APPARATUS FOR RECONSTRUCTING THREE-DIMENSIONAL COMPUTERIZED TOMOGRAPHY (CT) IMAGE OF AN OBJECT FROM CONE BEAM PROJECTION DATA OR FROM PLANAR INTEGRALS discloses a two step approach for performing an inverse Radon transform from planar integrals obtained on a plurality of coaxial planes. The first step involves calculating from the planar integrals a two dimensional projection image of the object on each of the coaxial planes; while the second step involves defining normal slices through these coaxial planes from which a two dimensional reconstruction of each slice is obtained. In this slice by slice way, the reconstruction algorithms operate on a plurality of planar integrals to produce a three dimensional image of the object.

In the first step of the cone beam reconstruction process, Radon data are calculated from cone beam data on each of a plurality of coaxial planes. On each of these coaxial planes, the Radon data generated from the cone beam scan along a three dimensional scanning trajectory are identical to data generated on that plane by a fan beam source scanning along a two dimensional scanning trajectory which is the projection of the three dimensional scanning trajectory on that plane. This has been shown in co-pending US patent application Ser. No. 07/737,117 entitled "METHOD FOR CONSTRUCTING A THREE DIMENSIONAL SCANNING TAJECTORY CAPABLE OF ACQUIRING A COMPLETE SET OF RADON DATA FOR EXACT IMAGE RECONSTRUCTION OF AN OBJECT IRRADIATED BY A CONE BEAM SOURCE".

Figure 3:
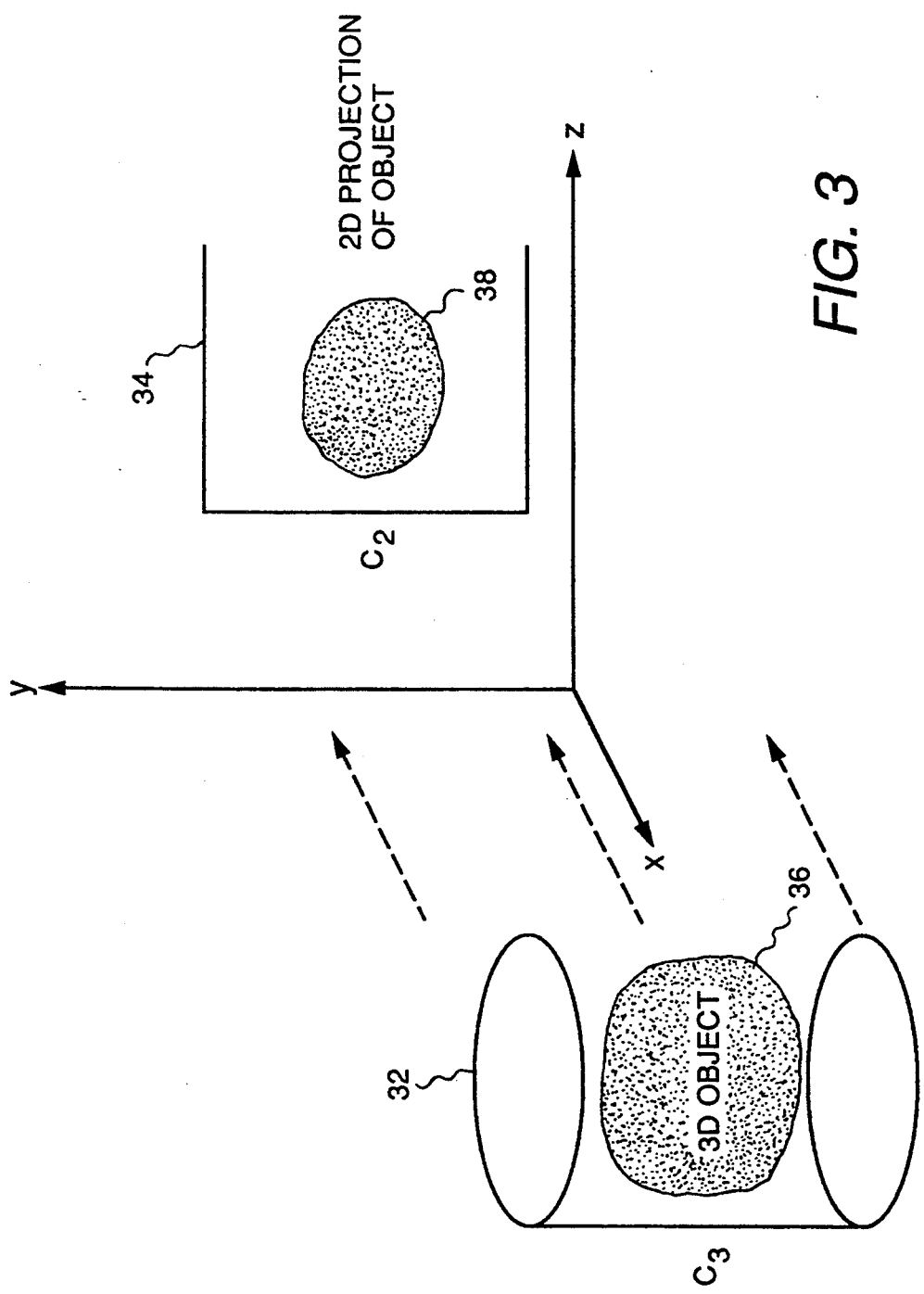
FIG. 3 illustrates a planar projection of a three dimensional scanning trajectory utilizing a commonly adopted trajectory consisting of two planar circles connected by a linear segment for scanning an enclosed object.

In FIG. 3 there is shown the geometry for the case of a commonly adopted three dimensional scanning trajectory consisting of two circular scan paths and a connecting linear scan path segment. FIG. 3 shows this three dimensional scanning trajectory 32 projected onto a plane, herein taken for convenience to be the yz plane, and identified as projected planar scanning trajectory 34. Note the three dimensional object being scanned 36 is also shown projected onto the yz plane as a planar projection of the object 38.

Figure 4:
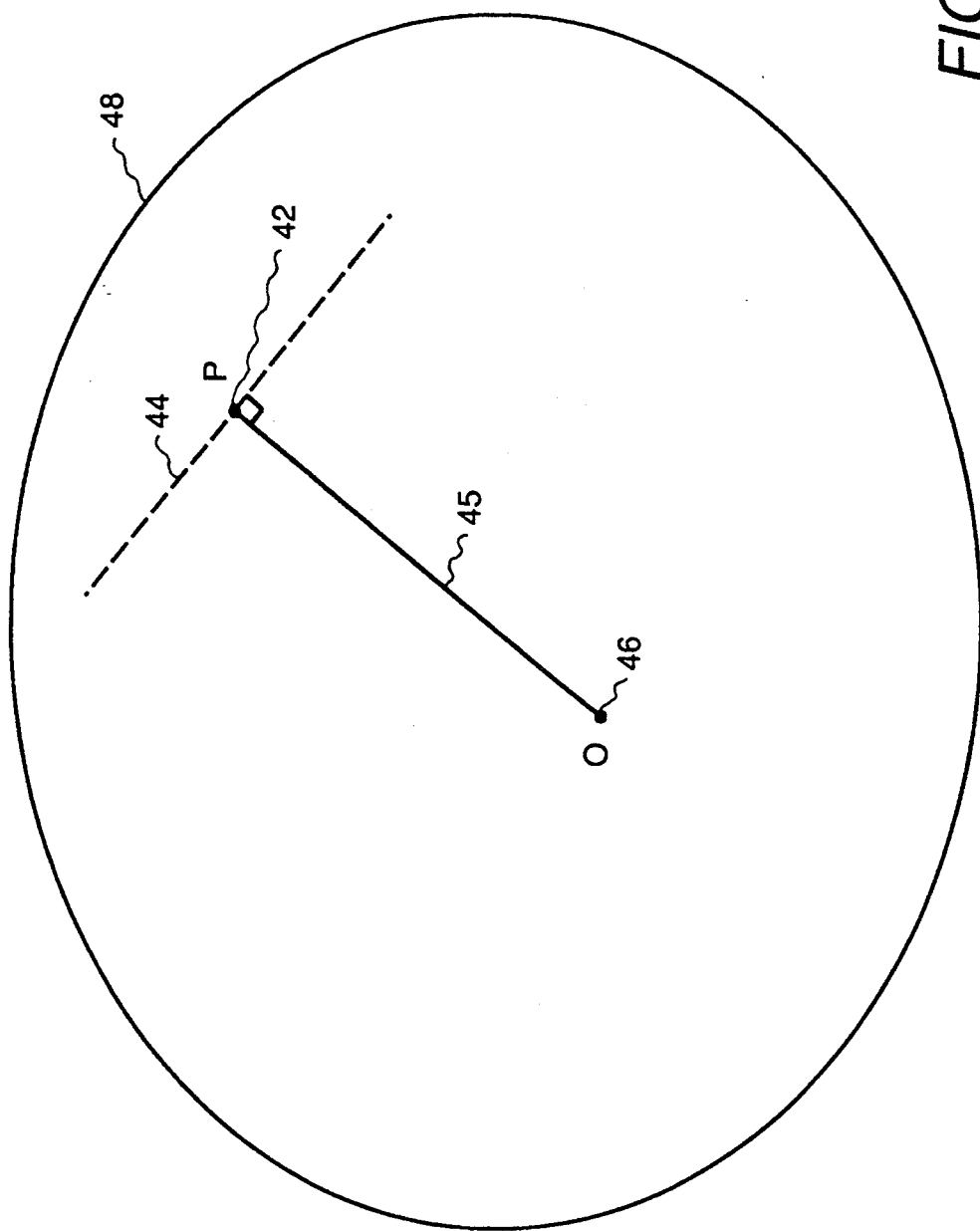
FIG. 4 illustrates a point within a continuous, closed convex planar projection of a scanning trajectory for which Radon data is desired at a point, indicating that any line normal to a segment connecting the point to the origin intersects the projection only twice resulting in uniform data density at that point, in accordance with the invention.

In FIG. 4 the Radon datum calculated at P 42 on the projection plane is due to cone beams traversing line 44 which represents the intersection of the projection plane with a surface orthogonal to a line segment 45 joining point P 42 and the origin, 46. However; the Radon datum calculated at point P 42 is equivalent to that due to a fan beam source traversing the planar projected scanning trajectory 48. If the line 44 does not intersect the planar projected scanning trajectory 48, no Radon datum will be generated at P 42. If, on the other hand, line 44 does intersect the planar projected scanning trajectory 48 at more than one point, more than one piece of Radon datum will be generated at point P 42. Consequently, the density of Radon data at point P 42 is directly proportional to the number of times line 44 intersects the planar projected scanning trajectory 48. This is true only if the signal-to-noise ratio among the cone beam data is substantially the same. Only then is the density of Radon data at each point a measure of the overall local signal-to-noise ratio.

For the sake of efficiency, only those points constituting the projected region of support, as referenced by numeral 38 in FIG. 3, necessarily contribute to image reconstruction. Therefore, uniform information coverage must be assured only for the projected region of support of the object. By geometry, if the planar projected scanning trajectory is a continuous, closed, convex curve, a straight line through each point interior to said closed convex curve must intersect said curve in two and only two points, consequently the density of Radon data therein is assured to be uniform. Furthermore, the completeness criterion is also satisfied as long as any straight line through any point of the projected region of support of the object intersects the closed, convex, planar projected scanning trajectory in at least one point. This recognition amounts to a practical, visual criteria for providing a three dimensional scanning trajectory capable of acquiring a complete and uniform Radon data set.

In accordance with the invention, if each planar projection of a candidate three dimensional scanning trajectory onto a corresponding set of coaxial planes utilized for image reconstruction by inverse Radon transform forms a continuous, convex, closed curve enclosing the corresponding planar projection of the object; then the Radon data set acquired thereby is sufficiently dense, i.e. complete, and necessarily uniform in distribution throughout the projected region of support of the object being scanned.

Figure 5:
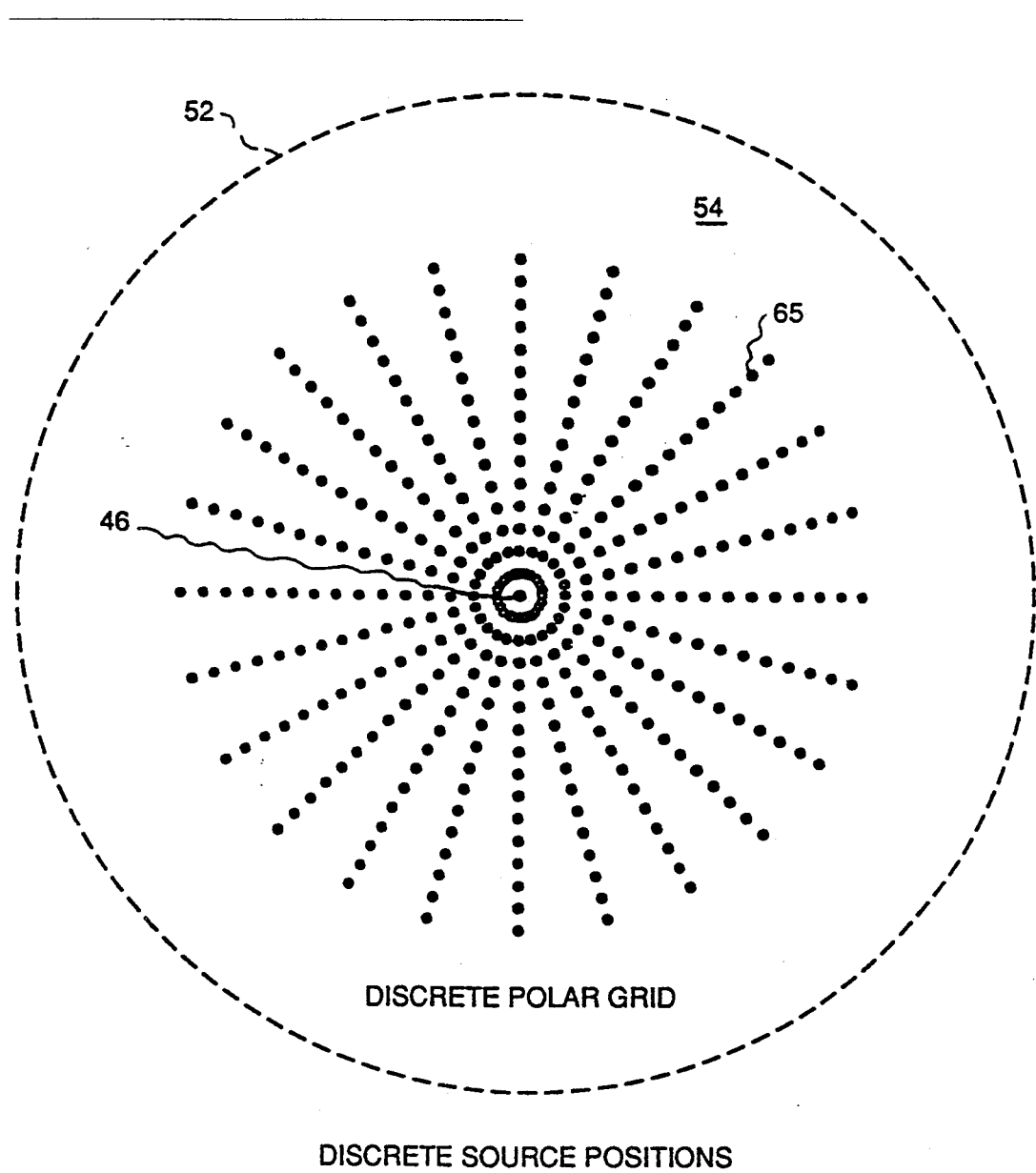
FIG. 5 illustrates a discrete polar grid corresponding to cone beam data taken at discrete source positions along the projected scanning trajectory.

This statement presupposes that the planar projected scanning trajectory is a continuous curve. In practice the source positions are sampled as illustrated in FIG. 5 at a number of discrete points along the scanning trajectory 52. Thus, the Radon data are actually acquired on a discrete polar grid identified at 54.

Figure 6:
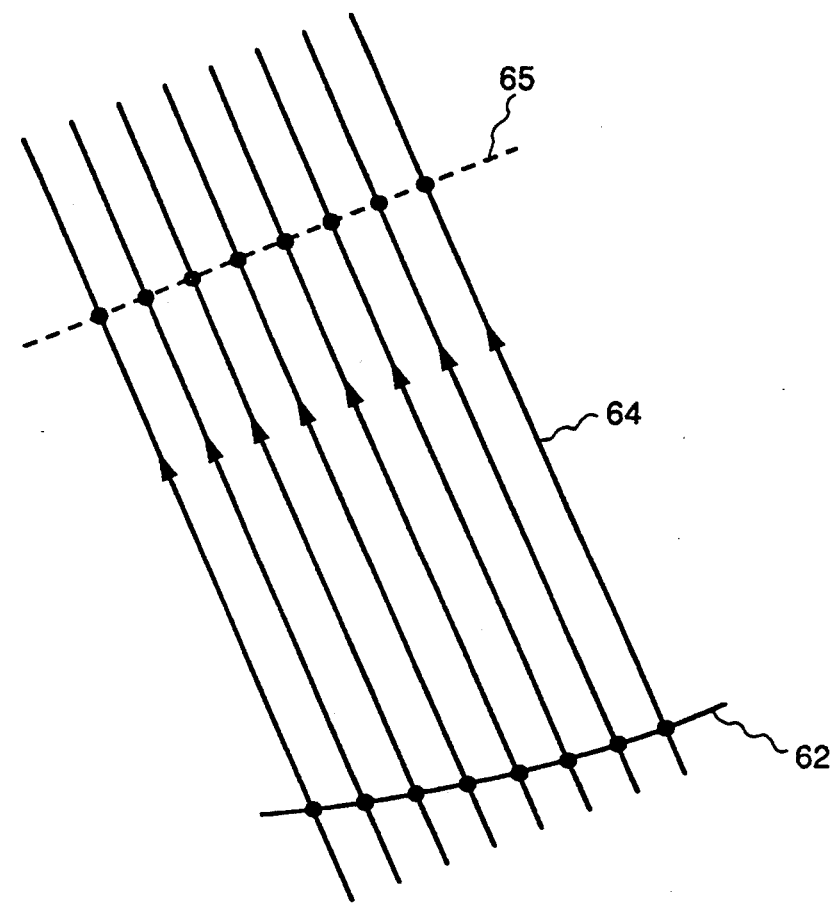
FIG. 6 illustrates the correlation between uniformity of source sampling positions along a trajectory and uniform sampling of Radon data for the case of a parallel source beam.

To better visualize the acquisition process for a polar grid FIG. 6 illustrates a section of scanning trajectory 62 is shown against parallel rays 64. Consider a line 65 which represents part of the polar grid. Note further that line 65 of FIG. 5 corresponds to line 45 of FIG. 4 wherein each data point of the grid is represented by point P 42. The Radon data on the discretely sampled points of grid line 65 are generated by the set of parallel rays 64. Clearly the spacing of the points where the set of parallel rays which pass through grid line 65 intersect scan path 62 depends on the direction of the rays with respect to the scan path. Note again that scan path 62 of FIG. 6 corresponds to scan path 52 of FIG. 5. In the special case wherein the scan path is a straight line segment, these intersection points would be equally spaced, since the sampled points on the grid are equally spaced. Thus, uniform sampling of Radon data on the polar grid line 65 directly corresponds to uniform sampling of the source positions on the section of scanning trajectory 62. Since this argument applies to each line making up the polar grid, the source positions are uniformly spaced for the special case of a straight line segment, resulting in uniform Radon data density along the polar grid.

The above arguments rest on ensuring that the cone beam data measured at each source position have substantially the same signal-to-noise ratio. This condition is satisfied if each source position appears to be at equal distance from the object. That is, although the distance between the source position and the object may vary, the exposure time or the integration time at each source position can be adjusted to be proportional to the square of the distance between the source position and the object. Such provision ensures the signal-to-noise ratio is substantially the same at every source position. In practice, the exposure time at each source position is fixed. To accommodate this situation, Radon data from different source positions that contribute to the same point in Radon space are proportionately weighted. The weight is proportional to the reciprocal of the inverse square of the distance between the source position and the object. In principle, this weighting procedure produces results mathematically equivalent to the varying exposure time since the signal-to-noise ratio at each source position is similarly proportional to the square of the distance between the source position and the object.

Figure 7:
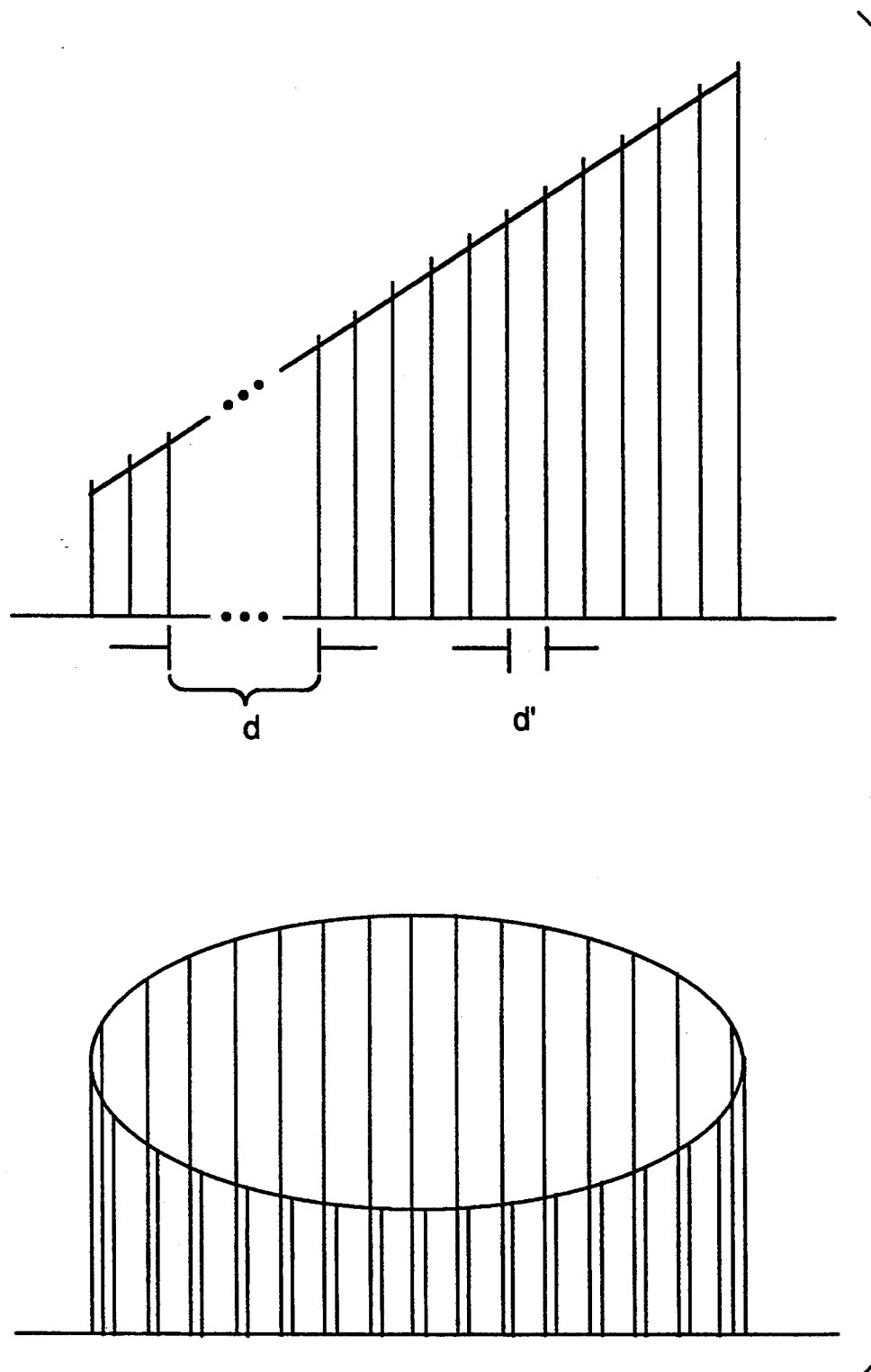
FIG. 7 comparatively illustrates projected uniformity being inherently preserved for the case of linear segment sampling and selectively preserved for the case of non-linear curve sampling.

In calculating the Radon data on a vertical coaxial plane, only those cone beam data from a subset of source positions whose projections on a coaxial plane are approximately uniform are used. It is expedient that the same uniform spacing be adhered to for each of the plurality of coaxial planes by a technique referred to herein as 'downsampling'. Down-sampling applied to linear scan segments is straightforward. For curves, other than linear segments, down-sampling is nontrivial being geometry specific, but still necessary. The concept involved in down-sampling is illustrated in FIG. 7 for linear and non-linear scan paths. For vertical scan segments, there is no need to down-sample providing the source positions are uniformly spaced along the line segments. For horizontal linear scan segments, it is recognized that projected source sampling positions on a planar projection of the scanning trajectory are distributed uniformly as long as scanning is conducted in a uniform manner along the three dimensional horizontal linear scan segments. In this way, uniformity is inherently preserved for linear projections, as seen in FIG. 7. The procedure is then to sample at every integer n, given by n=INT(d/d'), source positions, where d is the universal spacing of the down-sampled source positions on each coaxial plane, and d' is the actual spacing on the planar projected scanning trajectory. No general discussion of nonlinear down-sampling can be presented without referring to some specific curve. For the case of an elliptical scan path projected onto a segment, FIG. 7 illustrates that uniform angular sampling along the elliptical scan path linearly projects in such a way that sampling points are sparsest near the mid portion of the projected segment and densest near the ends of the projected segment. Thus, sampling points are selected in manner that preserves sampling uniformity along the projected segment. In this way, uniformity is selectively preserved for sampling along curves other than linear segments. The concept of down-sampling is more easily illustrated for linear segment projections as linear uniformity is inherently preserved. For the non-linear case, uniformity is selectively preserved by select retention of a uniformly distributed plurality of linearly projected sampling points corresponding to select sampling points along the non-linear curve.

In order to achieve uniform information coverage in Radon space a candidate cone beam scanning trajectory must project onto each coaxial plane a continuous, closed, convex curve enclosing the projection of the object on that plane. To implement this concept in a practical manner, on each coaxial plane one can select those portions of the three dimensional scanning trajectory whose select planar projections, when taken together, form a continuous, convex, closed curve enclosing a planar projection of the object. Only the cone beam data generated at the down-sampled source positions on these portions are retained to calculate the Radon data on the plane. Using this approach, the source positions on some portion of the scanning trajectory will be utilized in calculating Radon data on only some, not all, of the coaxial planes.

In accordance with the invention, a practical strategy for designing a three dimensional cone beam scanning trajectory involves finding one which satisfies the criteria that 1) on each coaxial plane it should be easy to identify which portions of the scanning trajectory which when projected on the plane form a closed convex curve; and 2) each portion of the trajectory is utilized in calculating Radon data on as many coaxial planes as possible.

Figure 8:
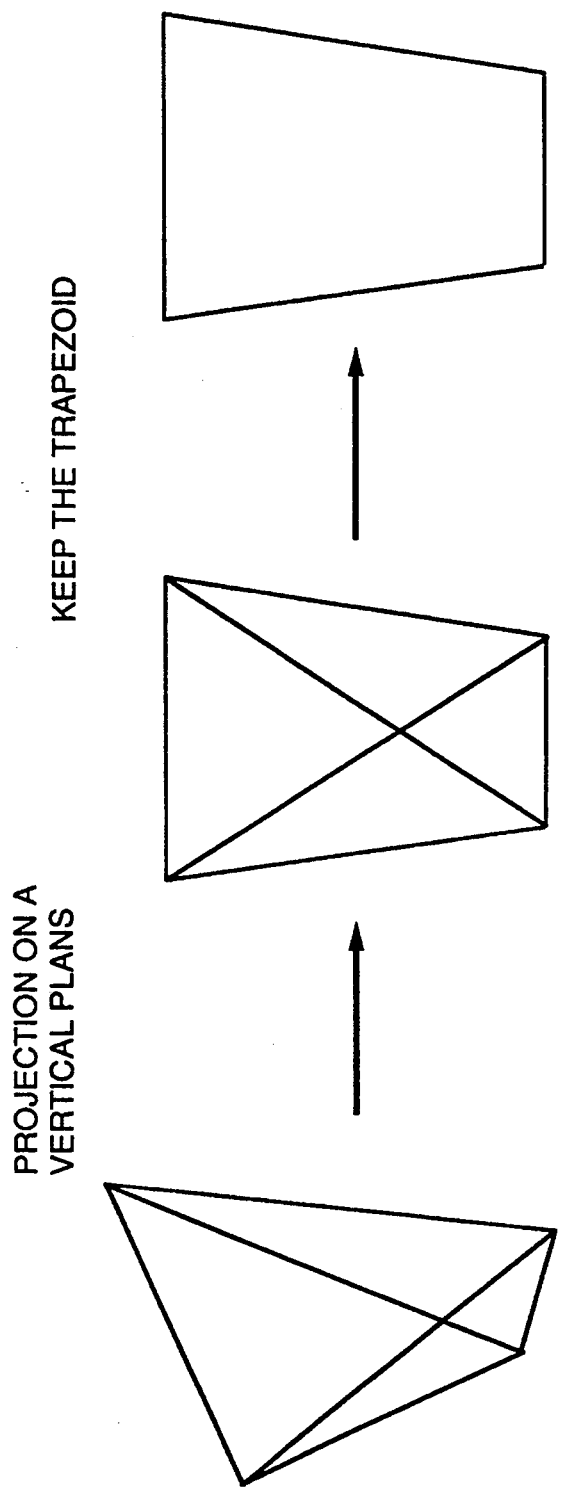
FIG. 8 illustrates the process of selectively forming a closed convex projected scanning trajectory on each vertical plane for a trajectory comprising all the edges of a tetrahedron.

A three dimensional scanning trajectory made up of all the edges of a tetrahedron is illustrated in FIG. 8. The projections of the six edges of a tetrahedron onto a plane form a complete quadrangle as shown. By discarding the source positions on the two edges of the tetrahedron which project onto the two diagonals of the quadrangle, the trapezoid which remains forms a closed convex curve; therefore meeting the aforementioned condition for uniform information coverage.

Figure 9:
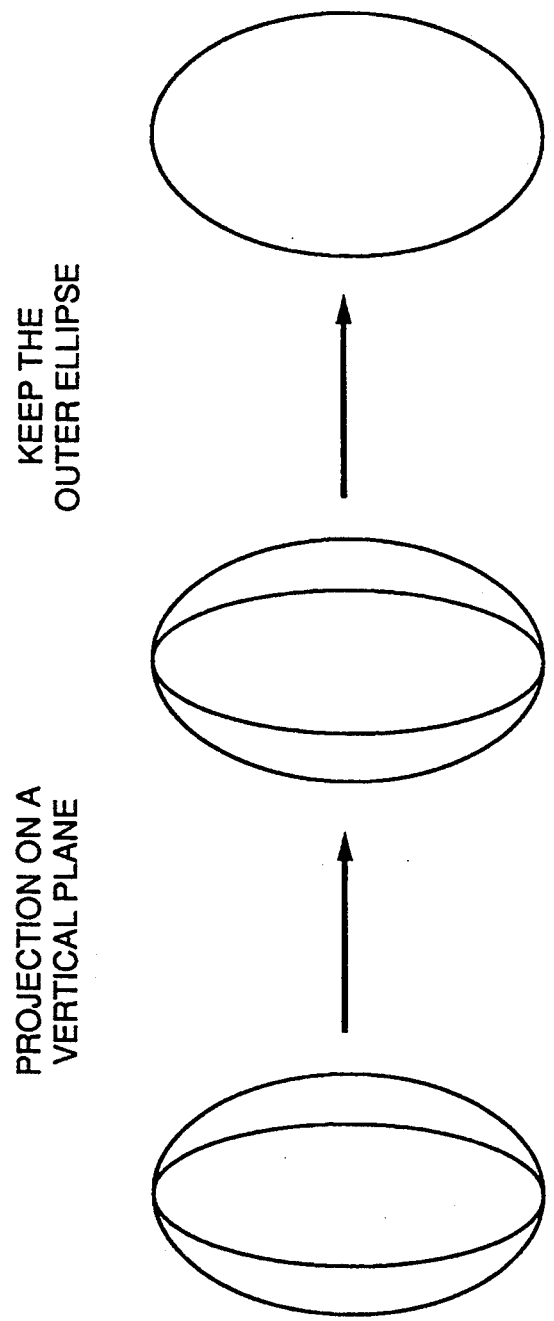
FIG. 9 illustrates the method of FIG. 8 for a trajectory comprising two circles intersecting along a common diameter.

A three dimensional scanning trajectory consisting of two perpendicular circles which intersect along a common diameter is illustrated in FIG. 9. The two circles project into a plane as two intersecting ellipses, one completely enclosing the other. For Radon data calculation on each coaxial plane select the circle whose projection on the plane is the larger of the two ellipses. The outer ellipse is a closed convex curve, therefore the condition for uniform information coverage is satisfied. If the two circles are orthogonal to each other, each should have a radius at least equal to $\sqrt{2}$ times the radius of the Radon sphere, corresponding to the spherical region of support of the object, in order that on every vertical plane the projected ellipse always encloses the projection of the object.

Figure 10:
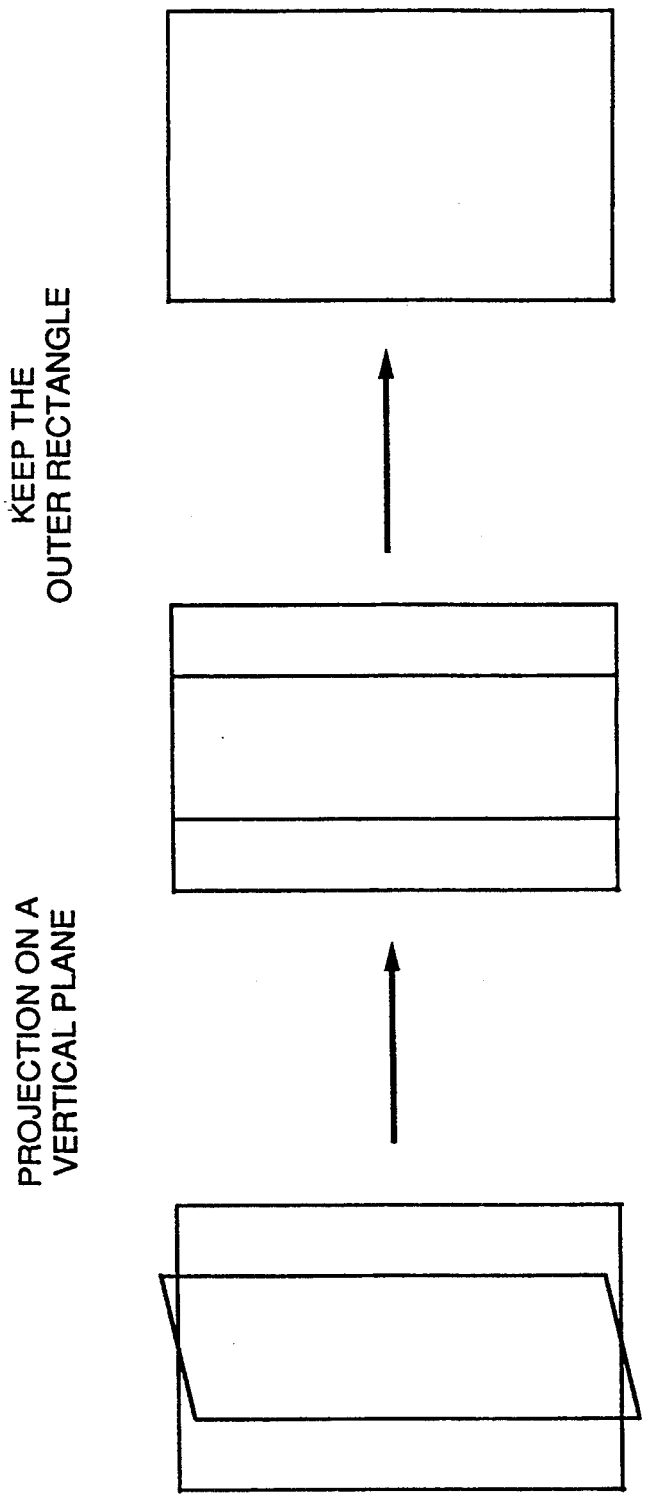
FIG. 10 illustrates the method of FIG. 8 for a trajectoy comprising two rectangles intersecting along a common mutually bisecting axis.

A three dimensional scanning trajectory consisting of two vertical rectangles which intersect each other at the top and bottom is illustrated in FIG. 10. The planar projection of the two rectangles is also two rectangles, one completely enclosing the other. For Radon data calculation on each coaxial plane select the rectangle whose projection on the plane is the larger of the two rectangles. As a rectangle is a closed convex curve, the condition for uniform information coverage is satisfied. The length of the rectangles is the same as the diameter of the object, and if the two rectangles are orthogonal to each other, each should have a width equal to $\sqrt{2}$ times the diameter of the Radon sphere in order that on every coaxial plane the projected rectangle always encloses the projection of the object.

Figure 11:
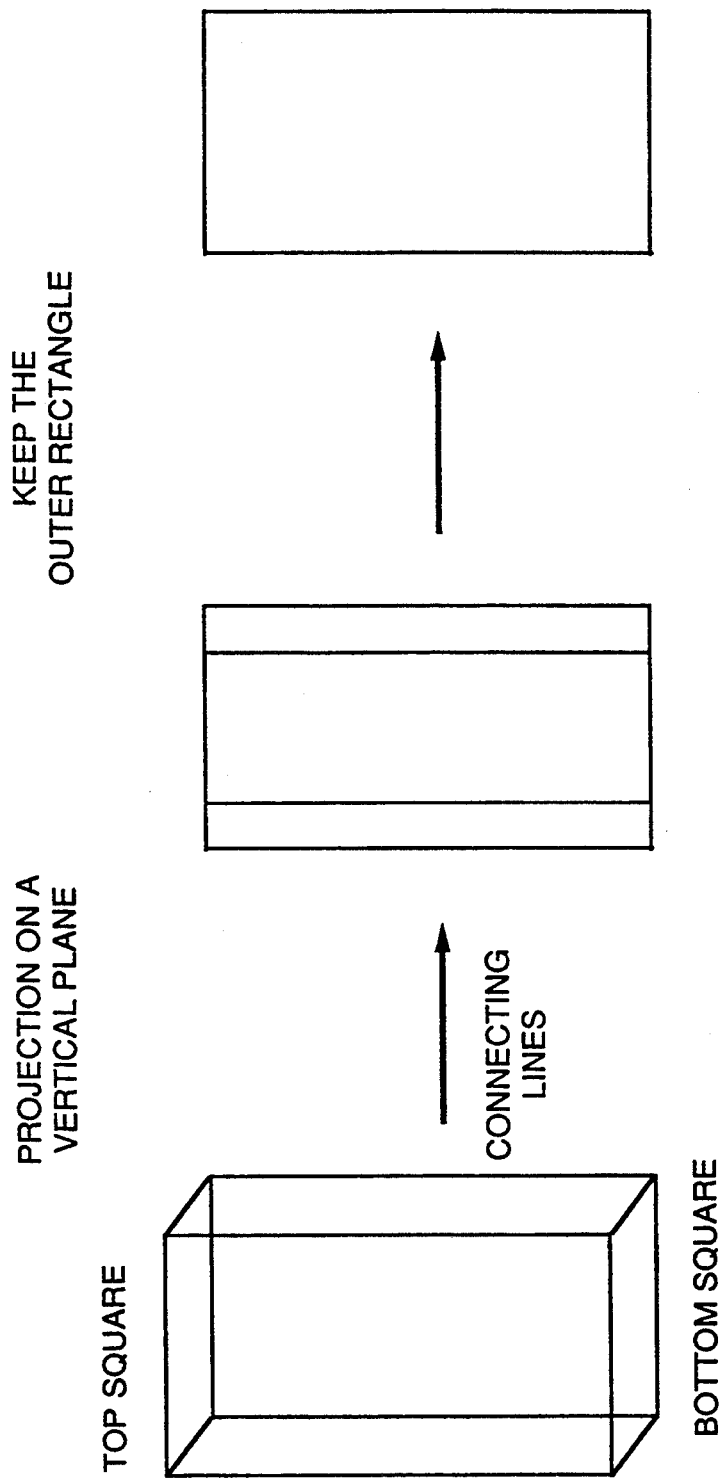
FIG. 11 illustrates the method of FIG. 8 for two polygons connected by linear segments.

A three dimensional scanning trajectory consisting of two polygons of the same shape connected at respective ends by linear segments is illustrated in FIG. 11 with four straight lines connecting two squares. The number of connecting straight lines is flexible, as long as it is more than two. The projection of the trajectory on each coaxial plane is a rectangle with some number of interior vertical lines, as shown in FIG. 11. For Radon data calculation on each coaxial plane, use only the source positions on the two outermost vertical lines, together with those on either the front or the rear portion of each polygon. The front and the rear being defined by the two outer vertical lines. These portions taken together form a rectangle which is a closed convex curve satisfying the condition for uniform information coverage.

Figure 12:
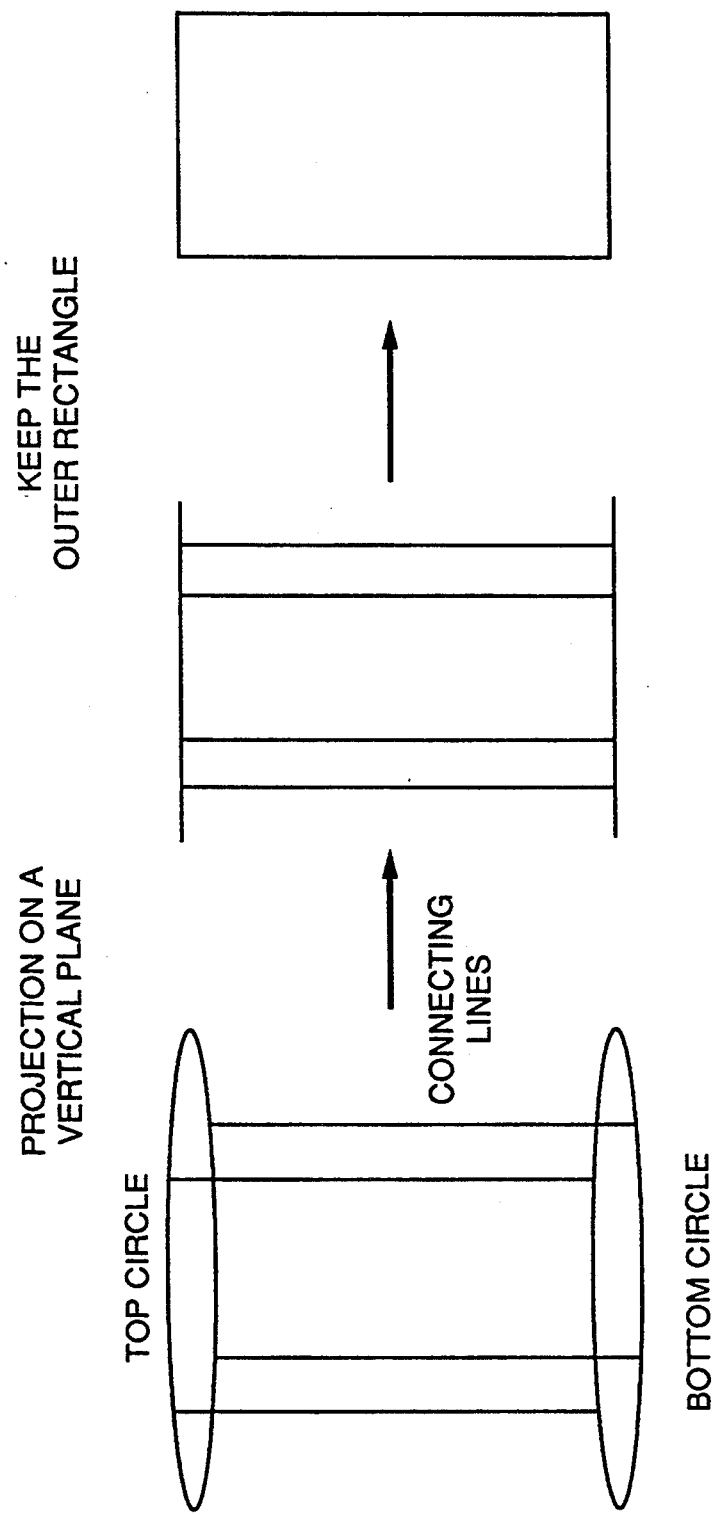
FIG. 12 illustrates the method of FIG. 8 for two circles connected by linear segments.

A three dimensional scanning trajectory consisting of two circles connected at matching positions on the circumference by straight linear segments is shown in FIG. 12 for four connecting segments. The number of connecting segments is flexible as long as it is more than two. The projection of the trajectory on each coaxial plane is a rectangle with some number of interior vertical lines, and with the linear projection of the circles protruding beyond these segments. For Radon data calculation on each coaxial plane, use only the source positions on the two outermost vertical lines, together with those on the minor arc of each horizontal circle connecting the two outer vertical lines. These portions taken together form a rectangle which is a closed convex curve satisfying the condition for uniform information coverage.

While specific embodiments of the invention have been illustrated and described herein, it is realized that numerous modifications and changes will occur to those skilled in the art. It is therefore understood that the appended claims are intended to cover all modifications and changes as fall within the true spirit and scope of the invention.

What is claimed is:

1. A method for acquiring discrete cone beam projection data along a three dimensional (3D) scanning trajectory in order to obtain a substantially uniform distribution of Radon data that is sufficiently dense to ensure the acquisition of a complete set of Radon data wherein said Radon data is organized onto a plurality of co-axial planes for exact image reconstruction of an object irradiated by a scanning cone beam source, said method comprising the steps:

ensuring substantially equivalent signal-to-noise ratio among cone beam projection data;

providing a 3D scanning trajectory such that at least a composite of corresponding planar projections of said trajectory forms a continuous, convex, closed curve about a corresponding planar projection of the object being scanned, the step of providing a 3D scanning trajectory further comprising selecting respective portions from a plurality of 3D scanning trajectory projections onto respective planes of said plurality of co-axial planes to collectively form a continuous, convex, closed curve enclosing the respective projection of said object; and discretely sampling at a corresponding plurality of cone beam source positions along said scanning trajectory in a manner providing uniformity in said distribution of Radon data.

2. Method according to claim 1 wherein the step of ensuring substantially equivalent signal-to-noise ratio among data further comprises mathematically accommodating substantially uniform irradiation of the object.

3. Method according to claim 2 wherein the step of accommodating said substantially uniform irradiation of the object is accomplished by varying irradiation exposure time.

4. Method according to claim 2 wherein the step of accommodating substantially uniform irradiation of the object is accomplished by proportionately weighting each of a plurality of source scanning positions which contribute to the same Radon datum.

5. Method according to claim 1 wherein said distribution of Radon data at any point enclosed by said planar projected curve corresponds to the number of times a line at said point, being normal to a segment connecting said point to an object centered origin, intersects said planar projected curve.

6. Method according to claim 5 wherein said step of providing uniform distribution of Radon data is automatically ensured by geometrically restricting said curve to a continuous, convex, closed curve, such that any said line intersects said curve in two and only two points, thereby ensuring uniformity.

7. Method according to claim 1 wherein the step of discretely sampling further comprises preserving relative uniformity among a plurality of planar projections, a technique herein referred to as down-sampling.

8. Apparatus for acquiring discrete cone beam projection data along a three dimensional (3D) scanning trajectory in order to obtain a substantially uniform distribution of Radon data on each of a plurality of co-axial planes that is sufficiently dense to ensure the acquisition of a complete set of Radon data for exact image reconstruction of an object irradiated by a scanning cone beam source, said apparatus comprising:

cone beam source;

planar array detector means fixed with respect to said cone beam source;

means for scanning along said 3D scanning trajectory wherein said trajectory satisfies the condition that at least a composite of planar projections of said trajectory provides a continuous, convex, closed curve enclosing a corresponding planar projection of the object, said scanning means further including means for selecting respective portions from a plurality of 3D scanning trajectory projections onto respective planes of said plurality of co-axial planes to collectively form a continuous, convex, closed curve enclosing the respective projection of said object;

means for discretely sampling cone beam projection data consistently at a select plurality of positions along said scanning trajectory;

means for collecting said cone beam projection data for image processing; and means for processing collected cone beam projection data into a three dimensional image by Radon inversion.

* * * * *